Figure 1:
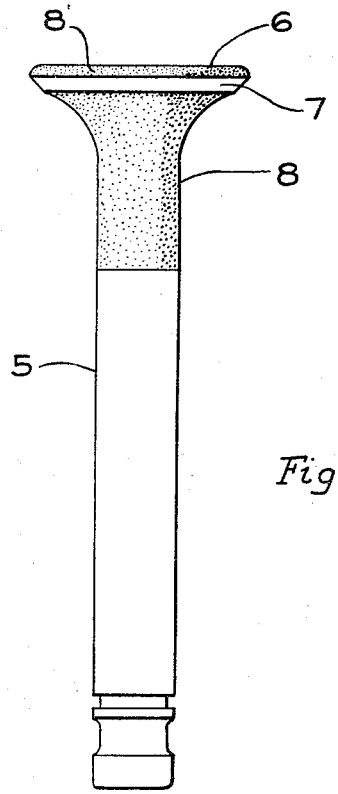

April 25, 1944.   W. T. KOESTERING   2,347,564
INSPECTION METHOD FOR COMPOSITE ARTICLES
Filed Dec. 14, 1942

INVENTOR
Walter T. Koestering
BY John F. Stark
ATTORNEY

Patented Apr. 25, 1944

2,347,564

UNITED STATES PATENT OFFICE 2,347,564

INSPECTION METHOD FOR COMPOSITE ARTICLES

Walter T. Koestering, Battle Creek, Mich., assignor to Eaton Manufacturing Company, Cleveland, Ohio, a corporation of Ohio Application December 14, 1942, Serial No. 468,951

9 Claims. (Cl. 148—7)

This invention relates generally to inspection of composite articles to visually determine the presence or absence of one of the component elements thereof, and, more particularly, concerns the color etching in a hot salt solution of a finished composite poppet valve having certain portions thereof formed of a corrosion-resistant alloy and other portions of a less corrosion-resistant metal to provide a visual inspection of the line of demarcation therebetween. The present application is a continuation-in-part of applicant's co-pending application, Serial Number 383,649, filed March 15, 1941, for "Inspection method for composite articles."

In the receiving inspection of composite aircraft valves by engine manufacturers, for example, it has been usual heretofore to acid etch a portion of such valves to bring out the line of demarcation between a corrosion-resistant facing material bonded to the valve seating portion, such as Stellite or Ni-Chrome, and other portions of the valve less resistant to corrosion; and after this form of inspection, in order to salvage the valve and to prepare it for use in service, it was necessary to neutralize the acid on the metal surface and repolish the affected areas. As will be readily apparent this procedure is both tedious and costly and obviously could only be effected on a few valves taken at random from those received to check the presence of the corrosion-resistant facing material, which cannot otherwise be visually distinguished from the adjoining surface metal.

The present invention overcomes the aforementioned random inspection method with its objectionable features and provides instead a simple visual inspection by color etching of the composite articles whereby every piece may be readily check if desired, without any subsequent labor operations to reclaim the articles for service use, and which gives positive proof of presence of the application of the desired material according to specification. Additionally, the teaching of the present invention may be used to provide a distinctive color to the finished article to identify a vendor which will readily distinguish that article for quality inspection by a vendee in differentiating it from similar unmarked articles supplied by other vendors.

Accordingly to this end, the primary object of this invention is the provision of color etching of finished composite metal articles to determine by visual inspection the meeting line or extent of application of certain component portions thereof; the provision in a composite article as above described, comprised in part of a heat and corrosion-resistant surface portion and other metal portions less resistant thereto, of subjecting the finished article to a color etching by any suitable solution which effects the component surfaces thereof in an unlike manner whereby a visual inspection will reveal the presence and extent of such otherwise indistinguishable unlike metals, and which does not otherwise render the metal surfaces unfit for immediate subsequent service use; the provision of a method of inspection of a composite poppet valve, having a high corrosion-resistant alloy seating surface portion and less resistant metal surfaces adjacent thereto, by etching the finished valve head in a hot salt solution whereby the unlike, and previously indistinguishable, adjacent metal surfaces react in said solution to reveal a visual color distinction therebetween and evidence the presence and extent of area thereof; the provision in a composite valve as described, consisting of a major portion of austenitic steel and a faced portion of a non-ferrous alloy, of color etching said valve to reveal the existence and extent of application of said non-ferrous alloy.

Further and other objects and advantages of the present invention reside in the novel etching process and appearance of the finished article as will become apparent from the following specification about to be described, when taken in conjunction with the accompanying drawing forming a part thereof and pointed out with particularity in the appended claims.

Figure 2:
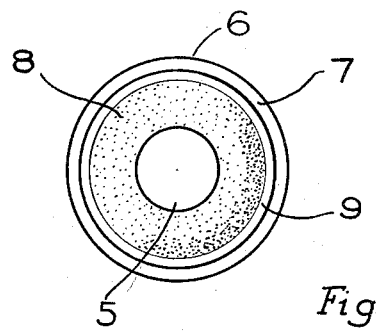

In the drawing like reference characters denote corresponding parts in the different views and in which:

Fig. 1 is a side elevational view of a composite valve color etched according to the present invention; and Fig. 2 is a bottom plan view thereof.

It will be understood that the teaching of the present invention may be applied to other than a composite poppet valve, shown here by way of illustration only, and covered specifically in the above mentioned co-pending application, and in the board sense may be applied to any composite metallic article subjected to heat and corrosion action at elevated temperatures in use, such as composite tappets, valve seat ring inserts, and pistons or other engine parts and the like. It may be applied likewise to a composite metallic article having a high wear-resisting surface portion covering a part of its marginal area to provide suitable life for the article when subjected to predetermined operating conditions. Hereinafter several examples of standard alloy analyses are set forth to illustrate representative materials with substantially unlike degrees of corrosion resistivity, which may be combined into one or more composite articles to form a basis for the inspection method of composite articles as claimed.

As aforementioned since the acid etching of composite valves, by way of example, is costly and may be done only at infrequent intervals by the buyer to satisfy himself as to the presence and extent of the characteristics of the specified metal surfaces, it has been determined by experimentation that after such a composite valve has been finished and passed manufacturing inspection, that by dipping the head of the valve in a hot salt solution the corrosion-resistant surface portion was not colored or oxidized by the hot solution, while the adjacent surface areas less resistant to heat and oxidization were distinctly oxidized to a particular color dependent upon the temperature to which the article was subjected. In this instance it was found that a combination of potassium nitrate and sodium nitrate in approximately the proportions of 50% and 50%, respectively, and heated to a temperature of from approximately 500° to 600° F. produced a straw or light copper color on the valve head and adjacent area of the stem and provided a definite line of demarcation with the uncolored valve seating surface, protected with a high corrosion-resistant alloy, such as Stellite or Ni-Chrome. Manifestly this temperature is sufficient to melt the salts so that a fused salt bath is provided into which the contiguous unlike metal surfaces of the composite article is dipped or immersed to produce the telltale color etching. Other suitable examples of different proportions of the color etching solution are 60% potassium nitrate and 40% sodium nitrate, or 70% potassium nitrate and 30% sodium nitrate, the principal factor affecting the relative percentages of each element being the attainment of the greatest color differential on the work piece with a minimum working temperature that will be sufficiently above the melting point of the salts to provide a fused salt bath which is not chilled materially by the introduction of cold work pieces to cause temporary "freezing" of the elements thereto.

Since such a hollow sodium cooled valve, as illustrated, is used principally in exhaust valve ports of large aircraft or truck engines, and entails several skilled operations it is not subject to large production methods and hence is a costly article to make which is rigidly inspected for quality. As the valve seating surface is protected by the above mentioned alloy, puddled on with a gas torch by hand and finished to size, it is not possible to recognize with the naked eye the presence and extent of area which is covered thereby, hence the simplicity and value of the present color etching for inspection and identification purposes, both to the valve manufacturer and the engine builder using the same, is apparent.

On the drawing the composite poppet valve illustrated has a stem 5, a head 6 and a valve seating surface 7. The stem and head portions of the valve are generally composed of an austenitic steel, classified as a ferrous alloy, while the seating surface 7 and adjacent lower surface 9 has been further protected by the application of a more corrosion-resistant facing layer of Stellite or Ni-Chrome, which are classified as non-ferrous alloys. In practice only the valve head and portions of the valve desired to be colored are dipped in the oxidizing solution, and the stipled portions, represented by the numeral 8, illustrates approximately the area covered in this instance. It will be noted, in Fig. 1, that the protected valve seating surface 7 may be sharply distinguished from over-lying stipled head edge 8' and the underlying stipled neck and stem portion 8; and, in Fig. 2, it will be clear from the concentric area 9, below and adjoining the adjacent seating surface 7, and which is also protected by the same corrosion-resistant surface metal as the valve seat, that by a simple visual inspection of the area concentric to and below the valve seating surface the extent of application of the uncolored corrosion-resistant surface metal may be readily determined. The protective coating of Stellite, Ni-Chrome, or the like, could if desired, of course, be applied completely over the whole head portion of the valve to accommodate certain operating conditions, when specified by the valve user, and in that instance the line of demarcation between the unlike surface metals would appear near the top of the valve stem, leaving the whole valve head uncolored by the etching process.

Examples of the above mentioned composite valve metals are the following:

Stellite (representative)

| Chromium | Tungsten | Cobalt | Balance (other elements) |
|---|---|---|---|
| 27.00–33.00 | 3.00–6.00 | Min. 55.00 | 7.50 |

Ni-Chrome (S. A. E.—Aeronautical Material Specification AMS–5682)

| Carbon | Manganese | Iron max. | Silicon max. | Sulphur max. | Chromium | Nickel |
|---|---|---|---|---|---|---|
| 0.15–0.30 | 0.60–1.00 | 1.00 | 0.30 | 0.030 | 19.00–21.00 | Balance |

Austenitic valve steel (S. A. E.—Aeronautical Material Specification AMS–5700)

| Carbon | Manganese max. | Silicon | Phosphorus max. | Sulphur max. | Chromium |
|---|---|---|---|---|---|
| 0.40–0.50 | 0.70 | 0.30–0.80 | 0.030 | 0.030 | 13.00–15.00 |

| Nickel | Tungsten | Molybdenum |
|---|---|---|
| 13.00–15.00 | 1.75–3.00 | 0.20–0.50 |

A common factor or characteristic in the above Stellite and Ni-Chrome alloys, as distinguished from the austenitic steel comprising the major portion of the valve body, is that they are substantially unaffected by the treating solution, whereas austenitic steel is readily oxidized thereby.

Illustrative of several standard alloys having substantially unlike properties of corrosion-resistance to color etching by an oxidizing non-acidic salt solution as mentioned in said co-pending application are the following materials which may be combined:

S. A. E. 52100

| Carbon | Manganese | Phosphorus max. | Sulphur max. | Silicon | Chromium |
|---|---|---|---|---|---|
| 0.95–1.10 | 0.30–0.50 | 0.025 | 0.025 | 0.20–0.35 | 1.20–1.50 | and

S. A. E. 9260

| Carbon | Manganese | Phosphorus max. | Sulphur max. | Silicon |
|---|---|---|---|---|
| 0.55–0.65 | 0.70–0.90 | 0.040 | 0.040 | 1.80–2.20 |

In a composite article made from the above combinations of alloys it is known that chemical properties afforded by the chromium content in the 52100 material has substantially greater resistance to color etching by the salt solution of the present inspection process, to determine the exact of area covered thereby and the line of demarcation, than the relatively less oxidization resistant 9260 material.

A further suitable combination of alloys to form a composite article is provided by,

S. A. E. 6150

| Carbon | Manganese | Phos. max. | Sulphur max. | Silicon | Chromium | Vanad. Min. |
|---|---|---|---|---|---|---|
| 0.48–0.55 | 0.65–0.90 | 0.040 | 0.040 | 0.20–0.35 | 0.80–1.10 | 0.15 | and

S. A. E. 3140

| Carbon | Manganese | Phos. max. | Sulphur max. | Silicon | Nickel | Chromium |
|---|---|---|---|---|---|---|
| 0.38–0.43 | 0.70–0.90 | 0.040 | 0.040 | 0.20–0.35 | 1.10–1.40 | 0.55–0.75 |

In the above combination of metals the chrome-vanadium alloy 6150 has substantially greater oxidization resistance to the present color etching salt solution by reason of its higher chromium content than the less resistant chrome-nickel material 3140.

A third combination of alloys which may be used to form a composite article is:

S. A. E. 5120

| Carbon | Manganese | Phos. max. | Sulphur max. | Silicon | Chromium |
|---|---|---|---|---|---|
| 0.17–0.22 | 0.70–0.90 | 0.040 | 0.040 | 0.20–0.35 | 0.70–0.90 | and

S. A. E. 2330

| Carbon | Manganese | Phos. max. | Sulphur max. | Silicon | Nickel |
|---|---|---|---|---|---|
| 0.28–0.30 | 0.60–0.80 | 0.040 | 0.040 | 0.20–0.35 | 3.25–3.75 |

In this combination of alloys the high chromium content of the chromium alloy 5120 is definitely more oxidization resistant to the present color etching salt solution than the nickel alloy 2330 and will provide a clearly visible line of demarcation between the respective portions of each part of a composite article comprised thereof.

A fourth combination of a ferrous and non-ferrous alloy adapted to be united in a composite article is:

S. A. E. 1035

| Carbon | Manganese | Phosphorus max. | Sulphur max. |
|---|---|---|---|
| 0.32–0.38 | 0.60–0.90 | 0.040 | 0.040 | and

Monel

| Carbon | Manganese | Silicon | Nickel | Copper | Sulphur |
|---|---|---|---|---|---|
| Percent +.15 | Percent 1.00 | Percent .10 | Percent 67.00 | Percent 30.00 | Percent .01 |

From this combination of alloys it will be apparent the medium carbon steel 1035, which, of course, is the ferrous material, will be readily color oxidized by the non-acidic solution, while the non-ferrous Monel metal fortified by its nickel and copper content remains unaffected. This combination of materials illustrative of the use of a ferrous and non-ferrous alloy as contiguous surfaces is suitable for use in tappet bodies of the mushroom type which may have a wear resisting cam-contacting face puddled on and finished to size, and in which polished finished condition the line of demarcation between the respective metals are visually indistinguishable.

It will be understood that in the four combinations of alloys above mentioned although all of these alloys may be less oxidization resistant to said non-acidic color etching solution than the unlike metals of the composite valve disclosed in said co-pending application it is desired to be pointed out that one of the alloy metals in each of the four combinations above will be differentially color oxidized substantially more than the other metal to visibly exhibit a line of demarcation therebetween. This fact is pointed out because in the broad concept of the invention it is only necessary to have substantially unlike degrees of oxidization resistivity between each of the contiguous metal surfaces to bring out a visual color distinction therebetween in the non-acidic etching solution even though each metal surface is color oxidized to some extent.

Obviously, of course, the temperature of the etching solution is controlled so as to keep it well below the drawing or annealing temperature of the article in order to cause no distortion thereof, or affect the properties of the metals; and the salt solution is regulated in proportion of its elements so as to reduce the melting point of the combination of elements to a workable temperature. Only one example of a nitrate salt solution has been given herein but other suitable non-aqueous non-acidic etching solutions exist, as will be presently explained, the controlling factors being an alkaline or non-acidic solution which will not adversely affect the metal surfaces of the composite article, so that it requires further treatment before it may be used in service, and which will only affect the adjoining unlike metals to cause simple oxidization or differential coloring to a particular shade so that the extent and area of one metal may be distinguished from the other adjacent thereto. Illustrative of another non-aqueous non-acidic or alkaline etching solution is one comprised of approximately 53% potassium nitrate, 7% sodium nitrate and 40% sodium nitrite, having a melting point of approximately 430° F., which is well below a working temperature for the bath of 500°–600° F. A common factor or characteristic with respect to the color etching solution is believed to reside in the non-acidic or alkaline materials of any of the nitrate salt group. Consequently it is not intended to limit the scope of this invention to the particular solution revealed or the composite article operated upon but to include other composite articles and non-acidic etching solution processes thereon producing the particular effect specified.

From the foregoing disclosures it will be apparent that there has been revealed a novel color etching for inspection of composite articles according to the first mentioned objects of this invention, and since many modifications will be suggested to those skilled in the art to which this invention relates, formal changes may be made in the invention without departing from the spirit and substance thereof as defined by the scope of the following claims.

What I claim is:

1. The process of color etching a composite metal article composed of at least two contiguous metals having surface portions normally visually indistinguishable one from the other, one of said metals being a ferrous alloy and subject to discoloration under the action of a heated non-acidic solution consisting of sodium nitrate and potassium nitrate, and another of said metals being non-ferrous and non-oxidizable by said solution, which comprises: subjecting the surface portions of said article at said normally visually indistinguishable surface portions to the action of a heated non-acidic oxidizing solution consisting of sodium nitrate and potassium nitrate at a temperature of 500° to 600° F., whereby the surface metal comprising the ferrous portion less resistant to oxidization is color oxidized and thereby rendered visually distinguishable from the substantially greater oxidization resistant surface of said non-ferrous metal.

2. The process of color etching a composite metal article composed of at least two contiguous metals having surface portions normally visually indistinguishable one from the other, one of the metals being a ferrous alloy and subject to discoloration under the action of a heated non-acidic solution consisting of sodium nitrate and potassium nitrate, and another of said metals being Monel metal and being non-oxidizable by said solution, which comprises: subjecting the surface portions of said article at said normally visually indistinguishable surface portions to the action of a heated non-acidic oxidizing solution consisting of about 30 to 50% sodium nitrate and about 50 to 70% potassium nitrate, at a temperature of about 500° to 600° F., whereby the surface metal comprising the ferrous portion less resistant to oxidization is color oxidized and thereby rendered visually distinguishable from the substantially greater oxidization resistant surface of said Monel metal.

3. The process of color etching a composite article defined in claim 1, in which the non-acidic solution consists of about 30 to 50% sodium nitrate and about 50 to 70% potassium nitrate.

4. The herein described method of color etching a composite valve having an austenitic steel surface portion subject to attack and oxidation by a color etching solution, said surface portion having an oxidation resistant non-ferrous alloy facing thereon providing a valve seating surface immune to said solution, which comprises, subjecting the surface portions adjacent said faced portion of the valve to a non-acidic hot salt solution consisting of sodium and potassium nitrate, whereby only the surface portions of the valve not protected by said alloy facing are visually color etched.

5. The herein described method of color etching a composite valve having an austenitic steel surface portion subject to attack and oxidation by a color etching solution, said surface portion having an oxidation resistant non-ferrous alloy facing thereon providing a valve seating surface immune to said solution, which comprises, subjecting the surface portions adjacent said faced portion of the valve to a non-acidic hot salt solution, comprised of sodium and potassium nitrate at a temperature of 500° F. to 600° F., whereby only the surface portion of the valve not protected by said alloy facing is visually color etched to a characteristic copper shade.

6. The process of color etching a composite metal article composed of austenitic steel and a non-ferrous metal having surfaces arranged adjacent each other but normally visually indistinguishable one from the other, the austenitic surface only being subject to attack by color etching means, which comprises subjecting the surface portions of said article adjacent said visually indistinguishable metal surfaces to a non-acidic oxidizing means consisting of fused sodium and potassium nitrate, whereby the austenitic surface is color oxidized and thereby rendered visually distinguishable from the substantially greater oxidation resistant non-ferrous surface which is uncolored.

7. The herein described method of color etching a composite article having an austenitic steel surface portion subject to attack and oxidation by a non-acidic color oxidizing solution and a non-ferrous surface portion adjacent said austenitic steel surface portion, said non-ferrous surface being immune to attack by said solution, which comprises dipping only composite surface portions of said article in a non-acidic oxidizing solution consisting of sodium and potassium nitrate at an elevated temperature of predetermined amount, whereby the dipped portions comprised of the surface metal less resistant to oxidation are color oxidized and thereby rendered visually distinguishable from dipped portions of the substantially greater oxidation resistant surfaces which are uncolored.

8. The process of color etching a composite metal article composed of at least two contiguous metals having surface portions normally visually indistinguishable one from the other, one of said metals being austenitic steel and subject to discoloration under the action of a heated non-acidic solution consisting of sodium nitrate and potassium nitrate, and another of said metals being Stellite and non-oxidizable by said solution, which comprises: subjecting the surface portions of said article at said normally visually indistinguishable surface portions to the action of a heated non-acidic oxidizing solution consisting of sodium nitrate and potassium nitrate at a temperature of 500° to 600° F., whereby the surface metal comprising the austenitic steel less resistant to oxidization is color oxidized and thereby rendered visually distinguishable from the substantially greater oxidization resistant surface of said Stellite.

9. The process of color etching a composite metal article composed of at least two contiguous metals having surface portions normally visually indistinguishable one from the other, one of said metals being austenitic steel and subject to discoloration under the action of a heated non-acidic solution consisting of sodium nitrate and potassium nitrate, and another of said metals being Ni-Chrome and non-oxidizable by said solution, which comprises: subjecting the surface portions of said article at said normally visually indistinguishable surface portions to the action of a heated non-acidic oxidizing solution consisting of sodium nitrate and potassium nitrate at a temperature of 500° to 600° F., whereby the surface metal comprising the austenitic steel less resistant to oxidization is color oxidized and thereby rendered visually distinguishable from the substantially greater oxidization resistant surface of said Ni-Chrome.

WALTER T. KOESTERING.